Patented Aug. 14, 1928.

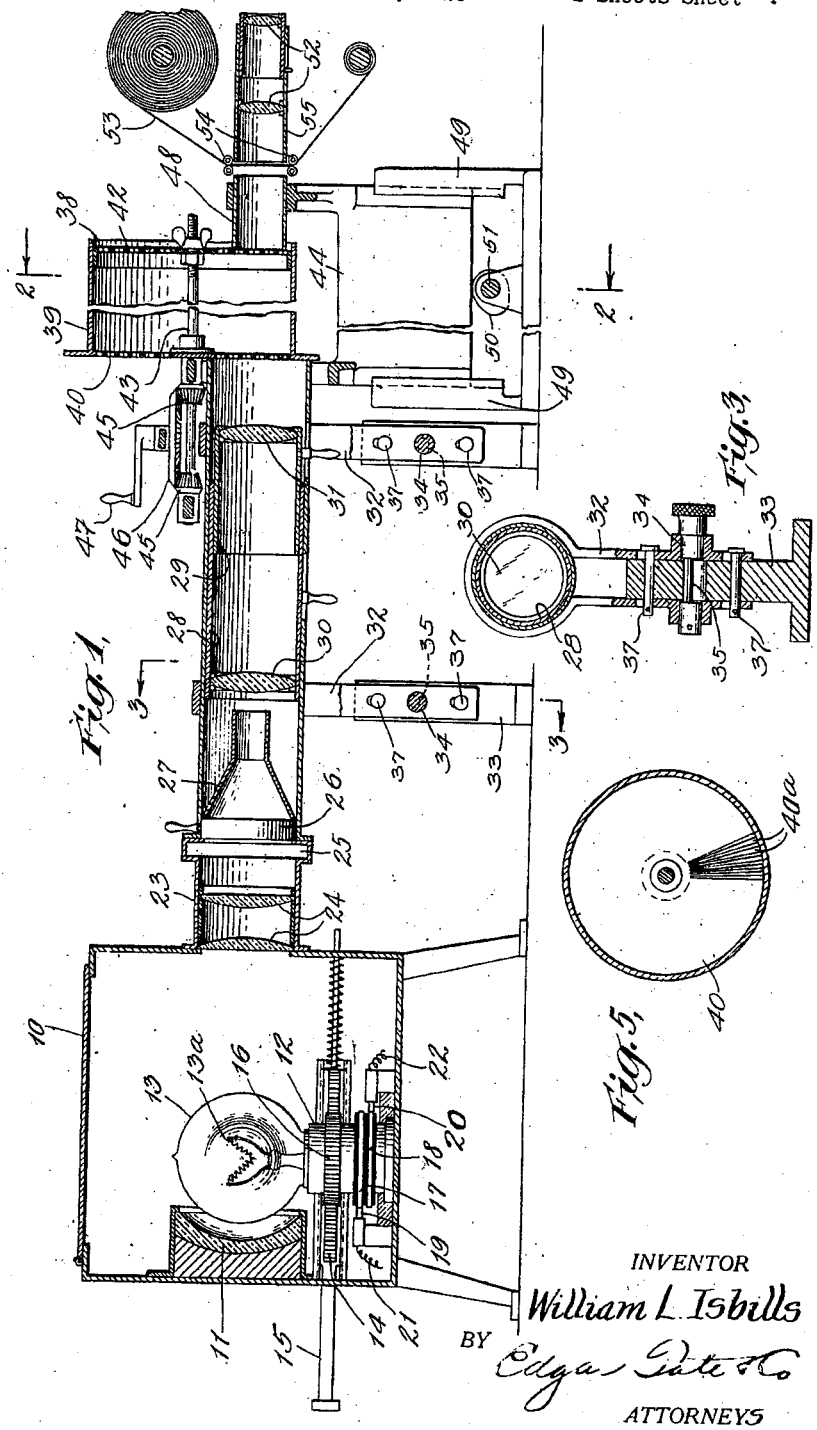

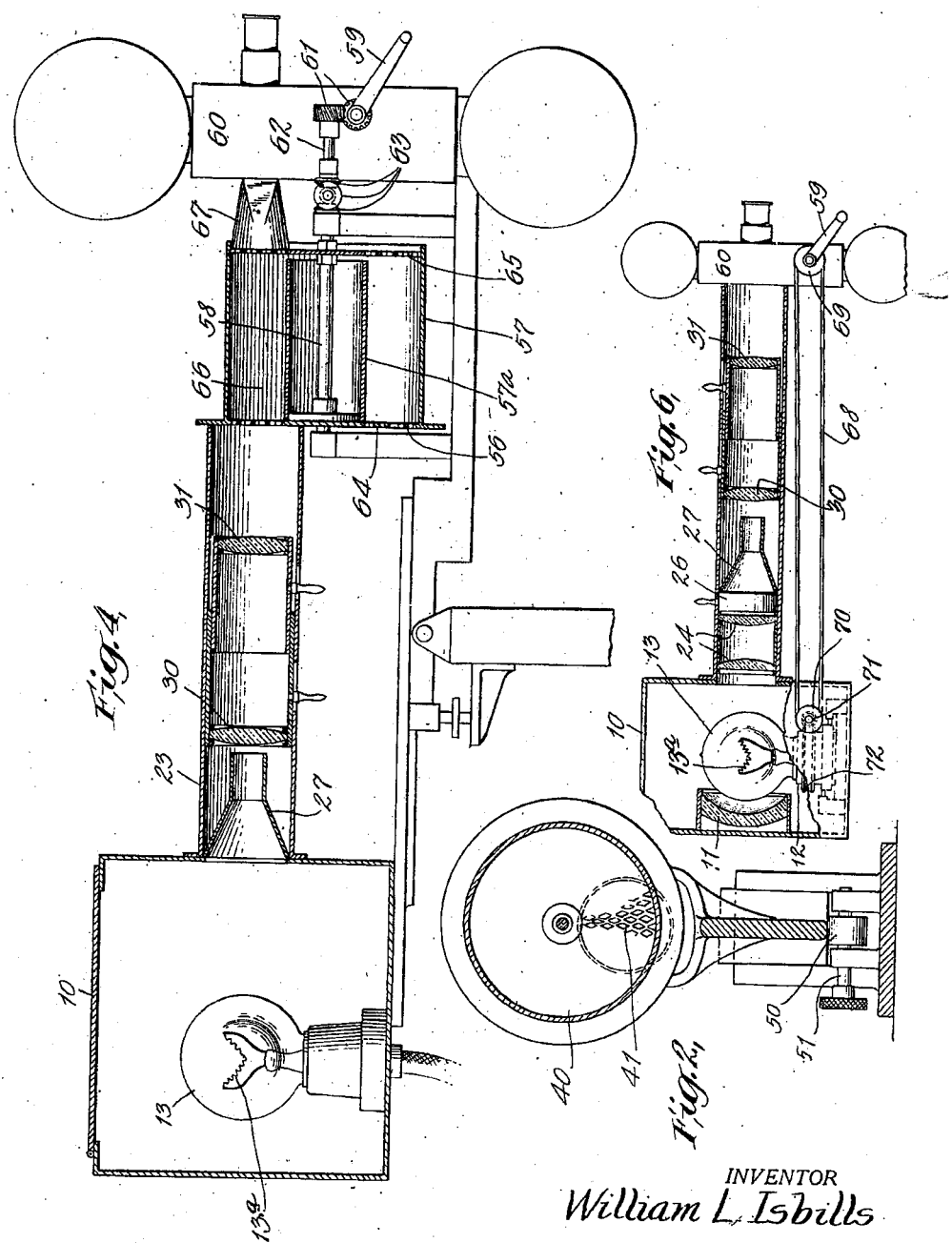

1,680,619

UNITED STATES PATENT OFFICE.

WILLIAM L. ISBILLS, OF ELIZABETH, NEW JERSEY.

METHOD AND APPARATUS FOR PRODUCING COLORED PROJECTED PICTURES.

Application filed June 13, 1923. Serial No. 645,051.

This invention relates to projecting apparatus of various kinds and classes, for example stereopticon machines of various kinds and classes and moving picture projecting machines, and particularly to a method and apparatus whereby photographic pictures on films or slides or other translucent pictures as usually produced and which are normally projected in black and white onto a screen, may be projected in pleasing color effects or wherein the image is projected in variegated colors; and the object of the invention is to provide an apparatus of simple construction and operation by means of which my improved method of producing projected colored pictures may be carried into effect, either by the projection of lantern slides, independent pictures or the like or in projecting motion pictures from a film of the usual construction; a further object being to utilize the colored lights reflected or radiating from an illuminating device, for example, an electric light bulb in conjunction with adjustable lenses for producing colors in the subject of a projected picture; a further object being to provide means interposed between the illuminating device and the film or other object to be projected, or between the illuminating device and the picture as projected on the screen, with means for concentrating the reflecting or emanating colored lights of the illuminating device to a predetermined area; and I also may provide means for intermittently interrupting said colored light rays to distribute the same in such manner that the picture or other subject to be projected will have a pleasing color effect or produce a vari-colored image; and with these and other objects in view, the invention consists in the method and apparatus for accomplishing projected colored pictures as above set out in a simple, practical and economical manner.

The invention is fully disclosed in the following specification, of which the accompanying drawing forms a part, in which the separate parts of my improvement are designated by suitable reference characters in each of the views, and in which:—

Fig. 1 is a diagrammatic sectional view through one form of my apparatus showing the substantial relative position of the several units employed.

Fig. 2 is a partial section on the line 2—2 of Fig. 1.

Fig. 3 is a partial section on the line 3—3 of Fig. 1.

Fig. 4 is a view similar to Fig. 1 but showing a modified form of apparatus.

Fig. 5 is a view similar to Fig. 2 but showing only a part of the construction and showing a modification; and, Fig. 6 is a view similar to Figs. 1 and 4 and showing another modification.

In Fig. 1 of the drawing I have diagrammatically illustrated a complete apparatus, by means of which lantern slides, individual pictures and the like may be projected, as well as motion pictures, and in said figure I have also illustrated a number of units, one or more of which may be operated in carrying my invention and improved method into effect or for producing a predetermined result in different ways, and in said figure I have shown at 10 the cabinet of a projecting apparatus in which is mounted a reflector 11 and a socket 12 for an electric light bulb 13. In the construction shown in Fig. 1 the socket is mounted to rotate or to be given a rotary, oscillatory movement by a rack 14 on a spring-controlled push rod 15 and a gear 16, which meshes with the rack 14. In this construction, the socket 12 is provided with two annular contact surfaces 17 and 18 in connection with which spring contacts 19 and 20 are adapted to operate, whereby the circuit to the lamp 13 may be closed through circuit wires 21 and 22. By rotating or imparting a rotary, oscillatory movement to the bulb 13, the filament 13ª thereof is correspondingly moved, whereby the color lights reflected or emanating from said filament may be distributed or interrupted in a given path.

Extending from the cabinet or casing 10 is a tubing 23 in the inner end of which is mounted condensing lenses 24 adjacent to which is a lantern slide holder 25, and outwardly of the lantern slide holder is an adjustable iris 26. Mounted in the tubing 23 in juxtaposition to the iris 26 is a funnel-shaped condensing member 27.

Adjustably mounted in the tube 23 are two sleeves 28 and 29, which carry projecting lenses 30 and 31, and the lenses 30 and 31 are of such construction and are so adjustably mounted as to project a picture, placed in the slide holder 25, onto a screen in a right side up position regardless of whether the picture is in erect or inverted position in the slide holder.

The tube 23 is mounted on supporting members 32, one of which is shown in section in Fig. 3 of the drawing, and these members are adjustable vertically to a slight extent on standards 33, the adjustment being accomplished by eccentrics 34 mounted on shafts 35 having milled heads 36 at one end, and upper and lower guide pins 37 are also employed for this purpose.

Mounted in juxtaposition to and in front of the free end portion of the tube 23 is an interrupter element 38 which in the construction shown in Fig. 1 is in the form of a tubular casing 39 provided at one end with an integral plate 40 perforated as partially indicated at 41 in Fig. 2 of the drawing and a detachable and adjustable disk 42 having similar perforations is mounted in the other end portion of the casing 39. The entire unit, involving the casing 39, plate 40 and disk 42 is mounted on a shaft 43 supported in a frame 44, and said shaft is provided with two beveled pinions 45 adapted to mesh with a beveled gear 46 operated by a crank 47. The frame 44 serves to support the element 38 including all of its operative parts as well as a tube 48, and said frame is mounted to move vertically in slide members 49 and is moved into different positions of adjustment by a cam or eccentric member 50 mounted on a shaft 51 as shown in Fig. 2 of the drawing.

At 52 in Fig. 1 of the drawing, I have indicated the projecting lenses of a moving picture projecting machine, and at 53, the film which passes between guide rollers 54, which are adapted to lock the film between the tube 48 and the tubular casing 55 in which the projecting lenses 52 are mounted.

As above described, the machine diagrammatically illustrated in Fig. 1 of the drawing may be used for projecting motion pictures or pictures from a motion picture film as well as lantern slides or other individual pictures, but in said figure I have shown a motion picture film in place, and when the apparatus is in use, the light from the bulb 13 including the color lights from the filament 13$^a$ of said bulb are first passed through the condensing lenses 24, then through the iris 26, which may be adjusted into any desired position, then through the funnel-shaped condenser 27, through the projecting lenses 30 and 31 wherein the color of the light is intensified by the color values of the lenses; then through the interrupter element 38, the disks 40 and 42 of which are rotated through the mechanism involving the crank 47, thus through the motion picture film and onto a screen through the projecting lenses 52.

In the above described operation, the iris and funnel-shaped condenser serve to collect the color lights and concentrate them to a predetermined area of the projecting lenses 30 and 31, and these colors, which through experience I find are every imaginable color of the rainbow and which also come from the lenses, are then passed through the interrupter element or through the small apertures or openings 41 in the disk 42 thereof, and in rotating this element the color lights are broken up and mingled in such manner that they are distributed onto the film in such a way that the film or the subject matter thereof appears to pick up or collects the colors which are transmitted to the image on the screen.

With the construction shown in Fig. 1, I may accomplish a similar result by eliminating the interrupter element 38 and by rotating or imparting a rotary, oscillatory movement to the bulb 13 or the said interrupter element may also be employed if desired, but from experience I find that either or both of these devices will accomplish substantially the same result.

In Fig. 5 of the drawing I have shown a modification of the plate or disk 40 wherein said disk is interrupted by elongated and radial apertures 40$^a$ instead of the diamond-shaped apertures 41 shown in Fig. 2 of the drawing, and if desired this construction may also be employed in the disk 42, but as a matter of fact any means or method of perforating the disks 40 and 42 may be employed so long as the light passed therethrough is intermittently interrupted and this may be accomplished in many ways, as will be apparent.

In Fig. 4 of the drawing, I have shown a slight modification in which a fixed electric lamp bulb 13 is mounted in the casing 10 and the condensing lenses 24 are omitted from the tube 23 as well as the lantern slide holder 25, and in this figure I have substituted for the interrupter element 38 a modified form of interrupter element 56 comprising a rotatable casing 57 mounted on a shaft 58 driven and rotated through the crank 59 of a motion picture machine 60, through gears 61 mounted on the shaft of the crank 59 and on a supplemental shaft 62, and by three transmission gears 63 which couple the shaft 62 with the shaft 58. Mounted in the casing 57 is a stationary or integral disk 64 similar to the disk 40 and an adjustable and detachable disk 65 similar to the disk 42, and in this construction I also employ a supplemental casing 57$^a$ which forms in the interrupter, an annular chamber 66 through which the light projected from the lenses 30 and 31 passes, and this construction operates to concentrate the light to a predetermined area as it passes through the interrupter. Mounted in connection with the projecting machine 60 is a tube 67 which cooperates with the disk 65 to transmit the light directly to the film in the projecting machine 60, and through the projecting lenses thereof.

With the construction shown in Fig. 4 of the drawing, it will also be noted that I have eliminated the reflector 11 from the casing 10, and I have found in practice that the use of this reflector is not absolutely necessary, and in use the light from the lamp bulb 13 is passed through the funnel-shaped condenser 27, thus through the projecting lenses 30 and 31 in which the rays are intensified and the color values increased or magnified materially, especially by the added color values of the lenses themselves; through the disks 64 and 65 and the chamber 66 in the interrupter 56, through the tube 67 and thus through the film and moving picture machine onto the screen, and substantially the same results will be obtained as described in connection with the use of the apparatus shown in Fig. 1 of the drawing. In other words, the various subjects on the picture of the film will be reproduced in colors by the colors in the light radiating from the filament 13ª of the electric bulb 13 as well as from the lenses 30 and 31 in the transmission of light therebetween from said filament. It will be understood that I may add to the apparatus shown in Fig. 4 any one or more of the elements shown in Fig. 1 if desired, and the light bulb 13 may be rotated or oscillated as shown in Fig. 1.

In Fig. 6 of the drawing, I have shown another modification which is of the same general structure as shown in Fig. 1 of the drawing, except that the interrupter 38 has been omitted and in this construction, the electric light 13 or the socket 12 thereof is rotated directly through the crank 59 of the motion picture machine 60, and in the accompanying drawing this is accomplished by a belt 68 passed around a pulley 69 on the shaft on the crank 59, and around another pulley 70 mounted on a shaft 71 in the casing 10, and by gears 71 and socket 12, a part of the gear on the socket 12 being indicated at 72 in said figure. It will be noted on a consideration of Fig. 6 of the drawing that the reflector 11 is employed as well as the condensing lenses 24, iris 26, funnel-shaped condenser 27 and projecting lenses 30 and 31.

From the foregoing description of the different combinations of the apparatus, it will be apparent that the desired result may be accomplished in many different ways by using an interrupter, or by rotating or imparting a rotary, reciprocating movement to the electric light bulb, by providing suitable means for concentrating the light to a given or restricted path, and it will be apparent that I am not limited to any specific combination of the several elements herein shown and described, nor am I limited to the specific construction of the several elements employed, nor the location of such elements, as various changes in and modifications of the construction herein shown and described may be made within the scope of the appended claims without departing from the spirit of my invention or sacrificing its advantages.

The distinctive feature of my invention resides in the use of the colors emanating or reflecting from an illuminating device of any kind or class and concentrating these color lights to a predetermined path and passing the same through adjustable lenses which are positioned beyond the normal focusing positions, whereby said lenses, due to their chromatic aberration, separate the colors, and interrupting the colors so as to distribute the same in such manner that a picture projected onto the screen will have a pleasing color effect and will contain throughout the area thereof, variegated colors, and this result is accomplished without in any way, treating, destroying, or modifying the picture film.

It will also be understood that the film may be located closer to the electric light bulb 13 than is shown in the accompanying drawing but by locating the film at a predetermined distance from the light in the manner shown and described, I avoid any possibilities of destroying a picture or film by fire, which is another distinctive advantage in apparatus of this class and especially in the production of moving picture films.

Having fully described my invention, what I claim as new and desire to secure by Letters Patent, is:—

1. The method of projecting the subjects of a positive photographic film onto a screen in pleasing color effects, which consists in adjusting projecting lenses relatively to and in the path of light emanating from an illuminating source, in such manner and due to their chromatic aberration as to project contrasting color light rays from said illuminating source through said lenses, and placing a film in the path of the contrasting color light rays projecting from said lenses whereby the subjects on said film will be projected onto a screen in colors.

2. The method of projecting the subjects of a positive photographic film onto a screen in pleasing color effects, which consists in adjusting projecting lenses relatively to and in the path of light emanating from an illuminating source, in such manner and due to their chromatic aberration as to project contrasting color light rays from said illuminating source through said lenses, placing a film in the path of the color light rays projecting from said lenses whereby the subjects on said film will be projected onto a screen in colors, and moving said color rays to distribute the same over said film.

3. The herein described method of projecting photographic pictures onto a screen in colors which consists in utilizing the light rays emanating from an illuminating device, arranging lenses relatively to said device and in the path of light emanating therefrom, and in chromatic aberration to each other in such manner as to project said light rays from said lenses emanating from said illuminating device in a multiplicity of colors, separating the color rays by the arrangement of lenses and directing said color rays projecting from said lenses onto a film whereby the subject matter of the film will be projected onto a screen in contrasting colors.

4. The herein described method of projecting photographic pictures onto a screen in colors which consists in utilizing the light rays emanating from an illuminating device, arranging lenses relatively to said device and in the path of light emanating therefrom and in chromatic aberration to each other in such manner as to project said light rays from said lenses emanating from said illuminating device in a multiplicity of colors, separating the color rays by the arrangement of lenses and directing said color rays projecting from said lenses onto a film whereby the subject matter of the film will be projected onto a screen in contrasting colors, and intermittently interrupting the color light rays emanating from said device prior to their passage onto the film.

5. The herein described method of projecting photographic pictures onto a screen in colors which consists in utilizing the light rays emanating from an illuminating device, arranging lenses relatively to said device and in the path of light emanating therefrom and in chromatic aberration to each other in such manner as to project said light rays from said lenses emanating from said illuminating device in a multiplicity of colors, separating the color rays by the arrangement of lenses and directing said color rays projecting from said lenses onto a film whereby the subject matter of the film will be projected onto a screen in contrasting colors, intermittently interrupting the color light rays emanating from said device prior to their passage onto the film, and concentrating the rays emanating from said device to a predetermined path prior to passing through said lenses.

6. The herein described method of projecting photographic pictures onto a screen in colors which consists in utilizing the light rays emanating from an illuminating device, arranging lenses relatively to said device and in the path of light emanating therefrom and in chromatic aberration to each other in such manner as to project said light rays from said lenses emanating from said illuminating device in a multiplicity of colors, separating the color rays by the arrangement of lenses and directing said color rays projecting from said lenses onto a film whereby the subject matter of the film will be projected onto a screen in contrasting colors, intermittently interrupting the color light rays emanating from said device prior to their passage onto the film, concentrating the rays emanating from said device to a predetermined path prior to passing through said lenses, and actuating the illuminating device to mingle the rays emanating therefrom.

7. The method of projecting color rays which consists in concentrating rays of light emanating from a source of illumination to a predetermined path, positioning widely spaced and relatively adjustable lenses in said ray path, and adjusting said lenses with relation to said illuminating source and relatively to each other to project from said lenses due to their chromatic aberration, rays of light emanating from said source in contrasting colors.

8. The method of projecting color rays which consists in concentrating rays of light emanating from a source of illumination to a predetermined path, positioning widely spaced and relatively adjustable lenses in said ray path, adjusting said lenses with relation to said illuminating source and relatively to each other to project from said lenses due to their chromatic aberration, rays of light emanating from said source in contrasting colors, and intermittently interrupting the color rays projecting from said lenses.

9. An apparatus for projecting uncolored pictures onto a screen in colors involving a projecting machine comprising an illuminating device emanating light rays, condensing lenses adjacent said device and in the path of light rays, other lenses outwardly of said condensing lenses and in said light ray path and adjustably arranged in chromatic aberration relation whereby the projection of rays therefrom from said illuminating device will be in contrasting colors, means for supporting a picture in the path of said contrasting color rays and projected from said lenses, and means disposed between the condensing and last named lenses for concentrating the rays emanating from said device to a predetermined path through said last named lenses.

10. An apparatus for projecting uncolored pictures onto a screen in colors involving a projecting machine comprising an illuminating device, emanating light rays, condensing lenses adjacent said device and in the path of light rays, other lenses outwardly of said condensing lenses and in said light ray path and adjustably arranged in chromatic aberration relation whereby the projection of rays therefrom from said illuminating device will be in contrasting colors, means for supporting a picture in the path of said contrasting color rays and projected from said lenses, means disposed between the condensing and last named lenses for concentrating the rays emanating from said device to a predetermined path through said last named lenses, and means interposed between said last named lenses and the picture supporting means and through which said color rays pass for mingling and distributing the color rays prior to the projection of same onto a picture supported in said means.

11. An apparatus for projecting uncolored pictures onto a screen in colors involving a projecting machine comprising an illuminating device, emanating light rays, condensing lenses adjacent said device and in the path of light rays, other lenses outwardly of said condensing lenses and in said light ray path and adjustably arranged in chromatic aberration relation whereby the projection of rays therefrom from said illuminating device will be in contrasting colors, means for supporting a picture in the path of said contrasting color rays and projected from said lenses, means disposed between the condensing and last named lenses for concentrating the rays emanating from said device to a predetermined path through said last named lenses, means interposed between said last named lenses and the picture supporting means and through which said color rays pass for mingling and distributing the color rays prior to the projection of same onto a picture supported in said means, and means for agitating said illuminating device whereby the light rays emanating therefrom may be agitated prior to their passage through said projecting lenses.

12. An apparatus for projecting uncolored pictures onto a screen in colors involving a projecting machine comprising an illuminating device, emanating light rays, condensing lenses adjacent said device and in the path of light rays, other lenses outwardly of said condensing lenses and in said light ray path and adjustably arranged in chromatic aberration relation whereby the projection of rays therefrom from said illuminating device will be in contrasting colors, means for supporting a picture in the path of said contrasting color rays and projected from said lenses, means disposed between the condensing and last named lenses for concentrating the rays emanating from said device to a predetermined path through said last named lenses, means interposed between said last named lenses and the picture supporting means and through which said color rays pass for mingling and distributing the color rays prior to the projection of same onto a picture supported in said means, means for agitating said illuminating device whereby the light rays emanating therefrom may be agitated prior to their passage through said projecting lenses, and projecting lenses outwardly of said picture supporting means for projecting the colored picture onto a screen.

13. In a projecting apparatus of the class described, the combination with an illuminating device supported in said apparatus and emanating a ray of light in the path of a pair of projecting lenses positioned in said ray path and adjustably supported in said ray path and arranged in chromatic aberration relation with each other whereby the rays of light from said device when passed through said lenses, will be projected in a multiplicity of contrasting colors.

14. In a projecting apparatus of the class described, the combination with an illuminating device supported in said apparatus and emanating a ray of light in the path of a pair of projecting lenses positioned in said ray path and adjustably supported in said ray path and arranged in chromatic aberration relation with each other whereby the rays of light from said device when passed through said lenses, will be projected in a multiplicity of contrasting colors, and means for agitating said device to agitate the light rays emanating therefrom.

15. In a projecting apparatus of the class described, the combination with an illuminating device supported in said apparatus and emanating a ray of light in the path of a pair of projecting lenses positioned in said ray path and adjustably supported in said ray path and arranged in chromatic aberration relation with each other whereby the rays of light from said device when passed through said lenses, will be projected in a multiplicity of contrasting colors, means for agitating said device to agitate the light rays emanating therefrom, condensing lenses disposed in the ray path between said device and projecting lenses, and means in said ray path outwardly of said condensing lenses for concentrating the rays emanating from said device to a predetermined path in the passage thereof through said projecting lenses.

16. In a projecting apparatus of the class described, the combination with an illuminating device supported in said apparatus and emanating a ray of light in the path of a pair of projecting lenses positioned in said ray path and adjustably supported in said ray path and arranged in chromatic aberration relation with each other, whereby the rays of light from said device when passed through said lenses, will be projected in a multiplicity of contrasting colors, condensing lenses disposed in the ray path between said device and projecting lenses, and means in said ray path outwardly of said condensing lenses for concentrating the rays emanating from said device to a predetermined path in the passage thereof through said projecting lenses, and other adjustable projecting lenses outwardly of and in spaced relation with reference to said first named projecting lenses.

17. In a projecting apparatus of the class described, the combination with an illuminating device supported in said apparatus and emanating a ray of light in the path of a pair of projecting lenses positioned in said ray path and adjustably supported in said ray path and arranged in chromatic aberration relation with each other, whereby the rays of light from said device when passed through said lenses, will be projected in a multiplicity of contrasting colors, condensing lenses disposed in the ray path between said device and projecting lenses, means in said ray path outwardly of said condensing lenses for concentrating the rays emanating from said device to a predetermined path in the passage thereof through said projecting lenses, other adjustable projecting lenses outwardly of and in spaced relation with reference to said first named projecting lenses, and means for supporting a picture in the ray path and between said first and second named projecting lenses.

18. In a projecting apparatus of the class described, the combination with an illuminating device supported in said apparatus and emanating a ray of light in the path of a pair of projecting lenses positioned in said ray path and adjustably supported in said ray path and arranged in chromatic aberration relation with each other, whereby the rays of light from said device when passed through said lenses, will be projected in a multiplicity of contrasting colors, condensing lenses disposed in the ray path between said device and projecting lenses, means in said ray path outwardly of said condensing lenses for concentrating the rays emanating from said device to a predetermined path in the passage thereof through said projecting lenses, other adjustable projecting lenses outwardly of and in spaced relation with reference to said first named projecting lenses, means for supporting a picture in the ray path and between said first and second named projecting lenses, and a rotatable interrupter supported and operating in the ray path and adapted to intermittently interrupt the projection of the ray.

19. In a projecting apparatus of the class described, the combination with an illuminating device supported in said apparatus and emanating a ray of light in the path of a pair of projecting lenses positioned in said ray path and adjustably supported in said ray path and arranged in chromatic aberration relation with each other whereby the rays of light from said device when passed through said lenses, will be projected in a multiplicity of contrasting colors, condensing lenses disposed in the ray path between said device and projecting lenses, means in said ray path outwardly of said condensing lenses for concentrating the rays emanating from said device to a predetermined path in the passage thereof through said projecting lenses, other adjustable projecting lenses outwardly of and in spaced relation with reference to said first named projecting lenses, means for supporting a picture in the ray path and between said first and second named projecting lenses, a rotatable interrupter supported and operating in the ray path and adapted to intermittently interrupt the projection of the ray, and an iris in the path of said light rays.

20. An apparatus for projecting the subjects of a positive photographic film onto a screen in varied colors comprising an illuminating device, projecting lenses in the path of light emanating from said device in spaced relation sufficiently greater than the sum of the focal length of said lenses, so that the passage of light rays therethrough from said device, will project from said lenses contrasting color rays, means for supporting a film in the path of the color rays projected from said lenses, and means for imparting movement to said color rays for distributing the same over said film whereby the projection of the film onto the screen will result in the projection of a vari-colored image.

21. An apparatus for projecting the subjects of a positive photographic film onto a screen in varied colors comprising an illuminating device, projecting lenses in the path of light emanating from said device in spaced relation sufficiently greater than the sum of the focal length of said lenses, so that the passage of light rays therethrough from said device will project from said lenses, contrasting color rays, means for supporting a film in the path of the color rays projected from said lenses, and means for imparting movement to said color rays for distributing the same over said film whereby the projection of the film onto the screen will result in the projection of a vari-colored image, said means involving a device for intermittently interrupting the color rays prior to their transmission onto the film.

22. An apparatus for projecting the subjects of a positive photographic film onto a screen in varied colors comprising an illuminating device, projecting lenses in the path of light emanating from said device, said lenses being spaced apart sufficiently greater than the sum of the focal length of said lenses, so that the passage of light rays therethrough from said device will project from said lenses, contrasting color rays, means for supporting a film in the path of the color rays projected from said lenses, means for imparting movement to said color rays for distributing the same over said film whereby the projection of the film onto the screen will result in the projection of a varicolored image, said means involving a device for intermittently interrupting the color rays prior to their transmission onto the film, and projecting lenses arranged in the path of light emanating from said illuminating device and projected through said lenses and film and outwardly of said film for focusing and projecting the subject of the film onto the screen.

In testimony that I claim the foregoing as my invention I have signed my name this 6th day of June, 1923.

WILLIAM L. ISBILLS.